Figure 5:
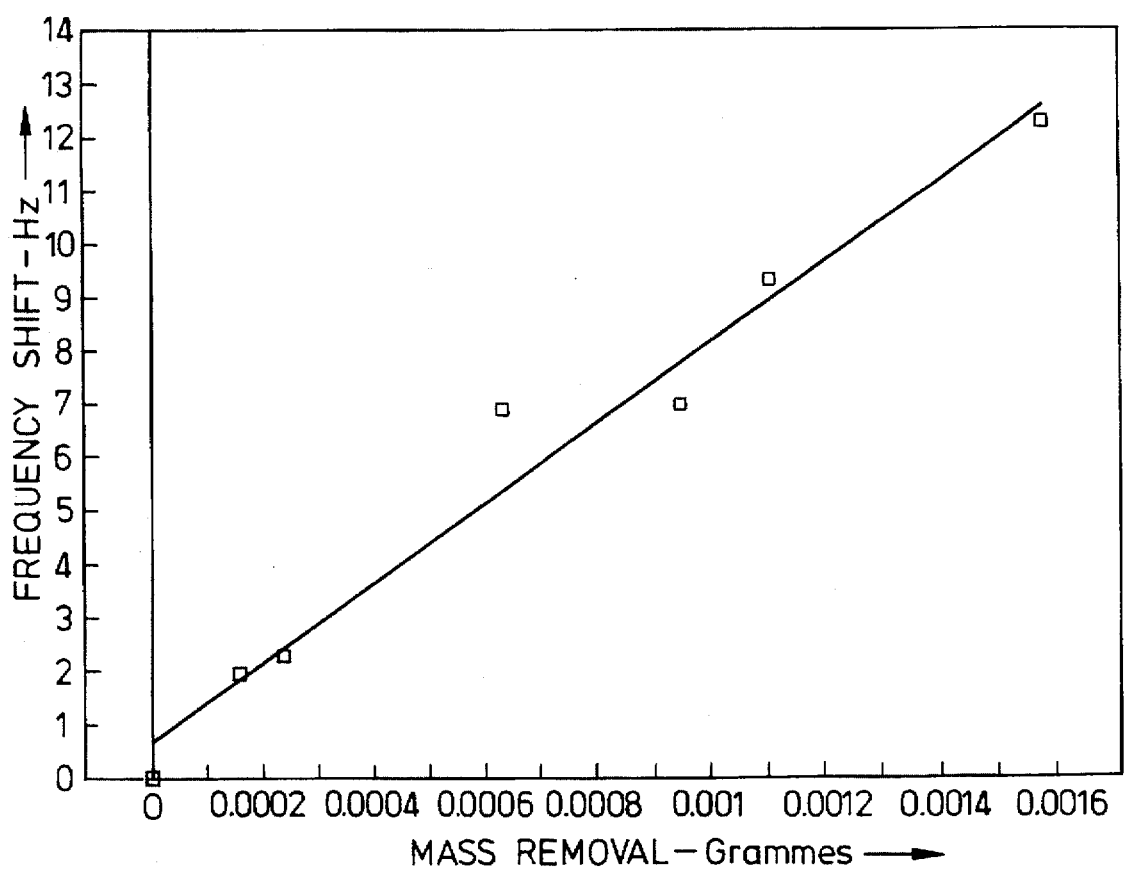

United States Patent
Fell

[11] Patent Number: 5,739,410
[45] Date of Patent: Apr. 14, 1998

[54] METHOD FOR MATCHING VIBRATION MODE FREQUENCIES ON A VIBRATING STRUCTURE

[75] Inventor: Christopher P. Fell, Plymouth, Great Britain

[73] Assignee: British Aerospace Public Limited Company, Farnborough, United Kingdom

[21] Appl. No.: 763,348

[22] Filed: Dec. 11, 1996

Related U.S. Application Data

[63] Continuation of Ser. No. 517,971, Aug. 22, 1995, abandoned.

[30] Foreign Application Priority Data

Aug. 24, 1994 [GB] United Kingdom ............... 9417044

[51] Int. Cl.$^6$ ..................................................... G01C 19/56
[52] U.S. Cl. ............................................................. 73/1 E
[58] Field of Search .................................................. 73/1 E

[56] References Cited

FOREIGN PATENT DOCUMENTS

| A-0-567 340 | 10/1993 | European Pat. Off. . |
| 2266588 | 11/1993 | United Kingdom . |
| 2272953 | 5/1994 | United Kingdom . |

*Primary Examiner*—Robert Raevis
*Attorney, Agent, or Firm*—Cushman, Darby & Cushman IP Group of Pillsbury Madison & Sutro LLP

[57] ABSTRACT

Vibration mode frequencies of a vibrating structure gyroscope sensing element are matched by removing and/or adding a desired variable amount of material from or to the sensing element (1) at at least one point (4) on or in the vicinity of the neutral axis (5).

7 Claims, 2 Drawing Sheets

Fig. 1A. (PRIOR ART)
Fig. 1B. (PRIOR ART)
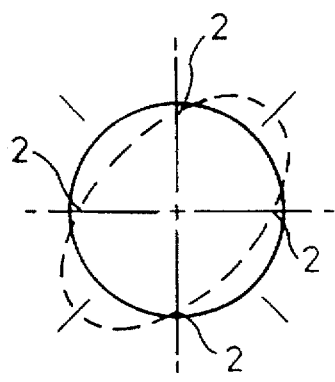
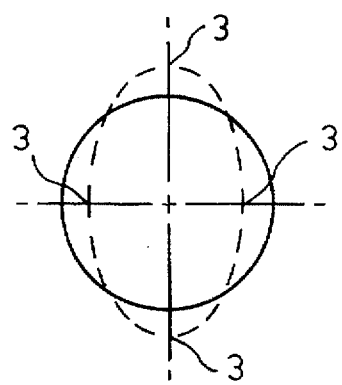
Fig. 2. (PRIOR ART)
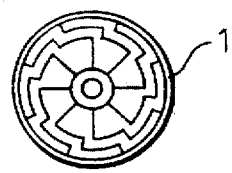
Fig. 3. (PRIOR ART)
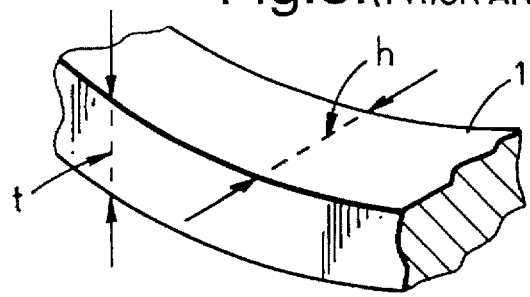
Fig. 4.
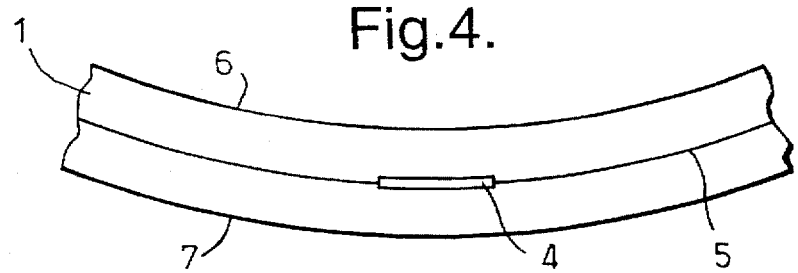

METHOD FOR MATCHING VIBRATION MODE FREQUENCIES ON A VIBRATING STRUCTURE

This is a continuation of application Ser. No. 08/517,971, filed on Aug. 22, 1995, which was abandoned upon the filing hereof this application Ser. No. 763,348.

This invention relates to a method for matching vibration mode frequencies on a vibrating structure, particularly but not exclusively, suitable for a vibrating structure gyroscope.

Conventional Vibrating Structure Gyroscopes generally use substantially cylindrical or substantially ring like structures as the sensing element.

These conventional sensing elements generally are driven resonantly on the cos 2θ mode with the ring or cylinder motion shown schematically in FIGS. 1A and 1B. There are two modes supported on the ring at a mutual angle of 45° with the first mode ring shown in FIG. 1A and the second mode in FIG. 1B. For a perfectly symmetric structure these modes will be degenerate in frequency but in practice there exists a frequency split due to imperfections in the structure and material which will lock the position of the vibration modes on the structure. In order to achieve optimum performance in such a vibrating structure element it is necessary to match these two frequencies to enable energy to couple efficiently between them.

A schematic view of a conventional vibrating structure element 1 is shown in FIG. 2. The resonant frequency dependence upon ring parameters is given by:

$$f \propto \sqrt{\frac{k}{m}} \quad \ldots \quad (1)$$

where k is the stiffness and m is the mass. Now $$K \alpha h^3 t/R^3 \quad (2)$$

and $$m \alpha Rht \quad (3)$$

where R is the radius of the ring, with h and t defined as in FIG. 3. Performing the substitutions, the t's cancel giving no frequency dependence upon this parameter but with f∝h. Adjusting the width parameter h is the conventional method for balancing the modes and will give a reduction in frequency as h is decreased. In terms of radial movement, the nodes 2 of the primary coincide with the anti-nodes 3 of the secondary and vice versa. Thus adjustments at these points will only effect the mode experiencing movement at this point.

Thus this conventional method, whilst effective, does have associated difficulties. Firstly, the frequency shifts obtained are relatively large for the small amounts of material removed and therefore accurate process control is required to attain the necessary frequency resolution. Secondly, when using laser cutting techniques requiring a gas assist, deflection of the gas jet by the edge of the ring can result in poor cut quality.

There is thus a need for a generally improved method for matching vibration mode frequencies on a vibrating structure.

According to one aspect of the present invention there is provided a method for matching vibration mode frequencies on a vibrating structure for a vibrating structure gyroscope, in which the vibrating structure is a substantially cylindrical or substantially ring-like sensing element, and in which a desired variable amount of material is removed from and/or added to the sensing element at at least one selected point on or in the vicinity of the neutral axis of the cross section of the element to displace and match the vibration mode frequencies around the element.

Preferably material is removed from and/or added to the element near points of maximum radial movement of the mode.

Conveniently the element is made of metal or silicon.

Advantageously the material is removed from the element by laser beam ablation.

Preferably the material is added to the element by adhesive.

Conveniently the method is applied to a substantially planar sensing element.

According to a further aspect of the present invention there is provided a vibrating structure sensing element for a vibrating structure gyroscope having material added thereto and/or removed therefrom according to the foregoing method of the invention to match vibration mode frequencies of the element.

For a better understanding of the present invention, and to show how the same may be carried into effect, reference will now be made, by way of example, to the accompanying drawings, in which:

FIG. 1A is a schematic diagram of a conventional vibrating structure sensing element driven resonantly on the cos 2θ mode with the element motion being shown schematically in the first or primary mode, FIG. 1B is a schematic view similar to that of FIG. 1A but showing the motion in a second or secondary mode, FIG. 2 is a plan view from above of a conventional vibrating structure element, FIG. 3 is a perspective view to an enlarged scale of a portion of a conventional vibrating structure sensing element in the form of a ring, FIG. 4 is a view in plan view of part of a vibrating structure sensing element in the form of a ring in stressed condition showing material removal or addition according to the method of the present invention and, FIG. 5 is a graphical representation of frequency shift in Hz against mass removal in grams showing a linear relationship thereto so that mass removal according to the method of the present invention produce a linear shift frequency variation.

The method of the present invention for matching vibration mode frequencies on a vibrating structure such as the substantially ring-like shaped element 1 for a vibrating structure gyroscope can also be used for a substantially cylindrical sensing element (not shown). In the method of the invention a desired variable amount of material 4 is removed from and/or added to the sensing element 1 at at least one point in the vicinity of the neutral axis 5 of the cross section of the element 1 to displace and match the vibration mode frequencies around the element. The variation in frequency shift with mass removal can be seen from the accompanying FIG. 5.

FIG. 4 of the accompanying drawings shows the bending of a uniform beam which dan notionally be taken as part of the element 1. The concave edge 6 experiences the maximum compression with the convex edge being under maximum tension. The stress changes from tension to compression across the cross section of the element 1 and at the transition between compression and tension there is a plane which is under no stress at all. This plane is termed the neutral axis and is shown at 5. Removal of and/or addition of material from the element 1 ring-like structure at at least one point in the vicinity of or along the neutral axis 5 will not affect the stiffness of the beam or element 1 but will however change its mass. Thus for the ring structure as shown in FIGS. 1, 2, 3 and 4 such addition and/or removal of material will give rise to an increase in the resonant frequency.

Thus, for example, the addition of material to the element 1 by applying controlled amounts of adhesive thereto at at least one point in the vicinity of and/or along the neutral axis 5 will lower the resonant frequency. By applying the material on the stress free region around the neutral axis 5 neither the stiffness nor the factor Q will be adversely affected. The addition of material such as at 4 has the advantage that balancing may be carried out repeatedly at the same point in an identical manner. The element 1 may be made of any convenient material such as metal or silicon and conveniently material is removed from the element by laser beam ablation. Advantageously material is removed from and/or added to the element 1 near points of maximum radial movement of the mode.

Experimental work has shown that material removal near points of maximum radial movement of the mode changes only the mode frequency significantly. The frequency shifts are quantifiable and consistent and for relatively small adjustments to the total mass of the ring like element 1 the frequency shift tends towards a linear dependence on the mass removed as can be seen from FIG. 5 of the accompanying drawings.

The frequency shifts using removal of material according to the method of the invention are considerably finer than those obtained when conventionally thinning the width of a ring 1 for equivalent material removal. An improvement resolution of over an order of magnitude is obtainable. Additionally the quality of cut is easier to maintain when cutting into the bulk material of the element 1 and the resolution and repeatability according to the method of the present application is dramatically improved over the conventional balancing methods.

I claim:

1. A method for matching vibration mode frequencies on a vibrating structure for a vibrating structure gyroscope, in which the vibrating structure is a substantially cylindrical or substantially ring-like sensing element, and in which a desired variable amount of material is removed from and/or added to the sensing element at at least one point on or in the vicinity of the neutral axis of the cross section of the element, to displace and match the vibration mode frequencies around the element, and wherein said desired variable amount of material is removed from and/or added to the sensing element in the absence of a change in width of the element.

2. A method according to claim 1, in which material is removed from and/or added to the element only near points of maximum radial movement of the mode.

3. A method according to claim 1 or claim 2, in which the element is made of metal or silicon.

4. A method according to claim 1, in which the material is removed from the element by laser beam ablation.

5. A method according to claim 1, in which the material is added to the element by adhesive.

6. A method according to claim 1, applied to a substantially planar sensing element.

7. A vibrating structure sensing element for a vibrating structure gyroscope having material added thereto and/or removed therefrom according to the method of claim 1 to match vibration mode frequencies of the element.

* * * * *